United States Patent
Narancic

(10) Patent No.: US 7,747,605 B2
(45) Date of Patent: Jun. 29, 2010

(54) ORGANIZATIONAL DATA ANALYSIS AND MANAGEMENT

(75) Inventor: Perry Narancic, Menlo Park, CA (US)

(73) Assignee: Perry J. Narancic, Menlo Park, CA (US)

( * ) Notice: Subject to any disclaimer, the term of this patent is extended or adjusted under 35 U.S.C. 154(b) by 256 days.

(21) Appl. No.: 11/406,197

(22) Filed: Apr. 17, 2006

(65) Prior Publication Data

US 2007/0244892 A1 Oct. 18, 2007

(51) Int. Cl.
*G06F 17/30* (2006.01)
(52) U.S. Cl. .................................. 707/711; 709/219
(58) Field of Classification Search .................. None
See application file for complete search history.

(56) References Cited

U.S. PATENT DOCUMENTS 7,272,594 B1 * 9/2007 Lynch et al. ............... 707/3
2002/0091709 A1 * 7/2002 Jung ....................... 707/104.1
2003/0179301 A1 * 9/2003 Feldis et al. ............. 348/231.3
2003/0187881 A1 * 10/2003 Murata et al. ............... 707/200
2005/0198153 A1 9/2005 Keohane et al.
2007/0198516 A1 * 8/2007 Ganapathy et al. ............. 707/7

OTHER PUBLICATIONS

"Matter Management," <http://www.cttymetrix.com> (visited Nov. 27, 2006).

* cited by examiner

*Primary Examiner*—Pierre M Vital
*Assistant Examiner*—Truong V Vo
(74) *Attorney, Agent, or Firm*—Kokka & Backus, PC

(57) ABSTRACT

Organizational data analysis and management are described, including evaluating an item comprising the organizational data, the item being created in a first application and having a first format, associating the item with the matter based on a type or a classification, and configuring the copy of the item for presentation in an interface associated with a second application using a second format, the copy of the item being configured for selection from within the second application in the first format.

20 Claims, 15 Drawing Sheets

| Organizational Data Analysis and Management System 220 |||
|---|---|---|
| E-mail 222 | Office productivity 224 | Project application 226 |

FIG. 5D

- 500
- 502
- 504 Create New Matter
- 506 Search E-mail
- 508 Extend Search
- 510 E-mail Statistics
- 512 Back
- 514 Help
- 522
- 516
- 518
- 530 Show Relevant E-mails
- MCN 001-001
- 524
- 526 Date:
- 532 Search
- ○ any word  ○ all words
- ⦿ whole word  ○ partial word
- 570 D – Other possibly relevant e-mails
- 572
- Read All  To  From  Subject  Date
- bill_abc@codemo.com  xyz@gmail.com  Non-client  10/8/2005
- MCN 001-001 subject 2
- Zoom In/Zoom Out
- Tag  Actions
- 574
- 578  576  Reply  Forward

ORGANIZATIONAL DATA ANALYSIS AND MANAGEMENT

FIELD OF THE INVENTION

The present invention relates generally to software architecture. More specifically, organizational data analysis and management are described.

BACKGROUND OF THE INVENTION

Computer programs and applications ("applications") generate a large amount of information and data. In organizations (e.g., private and public sector entities such as corporations, not-for-profit groups, government and other regulatory entities, or other groups of individuals organized to perform a set of related tasks or functions), large amounts of data are created, modified, deleted, saved, or retrieved, which becomes difficult to manage and analyze in order to perform functions related to specific types of data. Organizations in retail, commercial, office, industrial, medical, legal, and other industries generate large amounts of data. In order to manage this data, conventional enterprise and other large-scale applications such as document management systems were developed to help organize this data. However, conventional applications are problematic.

Conventional applications for organizing large amounts of data often rely upon a structured data storage schema (e.g., SQL, MySQL, Oracle, and others) that use overlying document management applications to organize and search through large amounts of data. Other conventional applications that organize unstructured data often rely upon indexing or require large amounts of storage and processing resources, which is expensive and time-consuming to implement and manage. Further, conventional applications for structured or unstructured data analysis and organization fail to provide data in any type of format that is useful or efficient. For example, if a corporate legal department is aggregating data and information related to a specific matter, conventional applications would search structured data based on a data storage schema (e.g., SQL, MySQL, Oracle, DB2, and others) and unstructured data relying on either indexing of the unstructured data or parsing of text associated with the unstructured data, which is time-consuming, processor-intensive, and inaccurate. Moreover, existing efforts to organize electronic data are based on manual or semi-manual efforts to tag or otherwise organize such data, which requires significant user intervention. Such user intervention is not only time consuming, but also susceptible to human error. Further, manual tagging (i.e., manually adding metadata) is difficult to enforce with respect to data management policies or parameters. Consequently, data found in response to search using conventional applications is difficult to use, poorly organized, and inefficiently presented (i.e., displayed on a user interface), which leads to additional time and labor being expended to sift through large amounts of data.

Thus, what is needed is a solution for organizing and managing data.

BRIEF DESCRIPTION OF THE DRAWINGS

Various embodiments of the invention are disclosed in the following detailed description and the accompanying drawings:

FIG. 5D illustrates yet another alternative exemplary user interface for organizational data analysis and management;

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Organizational data analysis and management are described, including a computer program or application ("application") that may be used to implement the described techniques. Items (e.g., e-mails, tasks, notes, calendars, dates, documents (e.g., electronic documents, presentations, spreadsheets, files, and other types), reminders, and others) may be associated with a matter. A matter may be a project, group of tasks, or related functions that may involve one or more items of the same or different types, as described above. In some examples, associating items with matters or projects may be performed by embedding matter tags into items that include logic and data configured for relating the item to a task. In other examples, associations may be established by applying classification logic. Items may be classified using matter tags or classification logic, which are configured to manually, automatically, or semi-automatically classify organizational data. When items are created, assigned, completed, sent, received, modified, deleted, replied to, and others, associations may be performed in order to organize and manage data (i.e., structured and unstructured data) in their native applications using an overlying, integrated application to provide efficient and accurate organization and management if, for example, a search request is executed.

Figure 1:
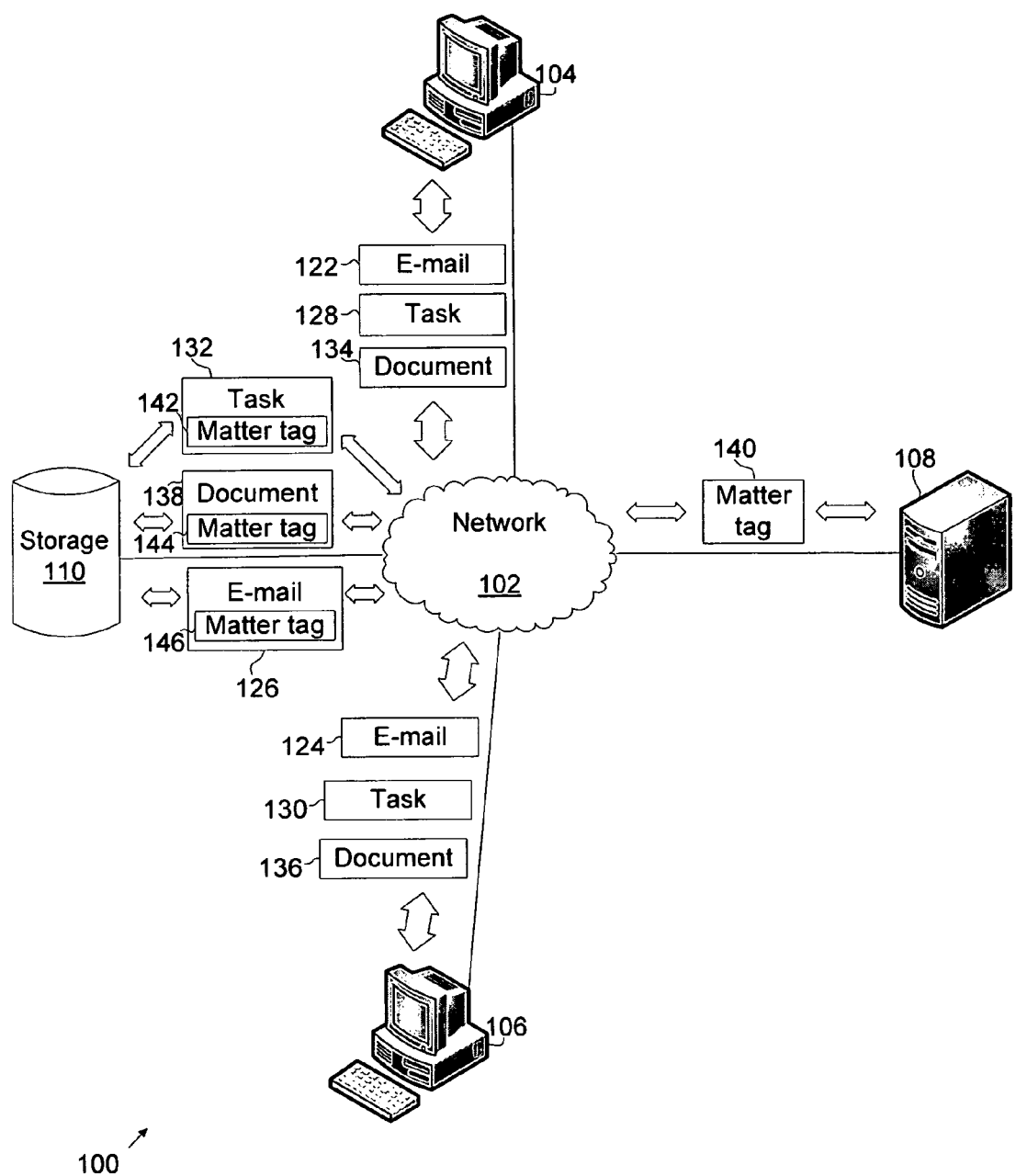
FIG. 1 illustrates an exemplary system for organizational data analysis and management.

FIG. 1 illustrates an exemplary system for organizational data analysis and management. Here, system 100 includes network 102, clients 104-106, server 108, and storage repository 110. Items 122-138 are routed (i.e., sent, received, transmitted, and the like) between clients 104-106, server 108, and storage repository 110. When associations are created between items and matters, matter tags 140-146 may be embedded in items 122-138. In some examples, matter tags 140-146 may be embedded or included with items 122-138 by "wrapping" a data layer or adding data (e.g., metadata and the like) to the item (regardless of whether the item is comprised of structured or unstructured data) to create an "associated item." In other examples, matter tags 140-146 may be embedded differently and is not limited to the techniques described above.

Figures 2A, 2B:
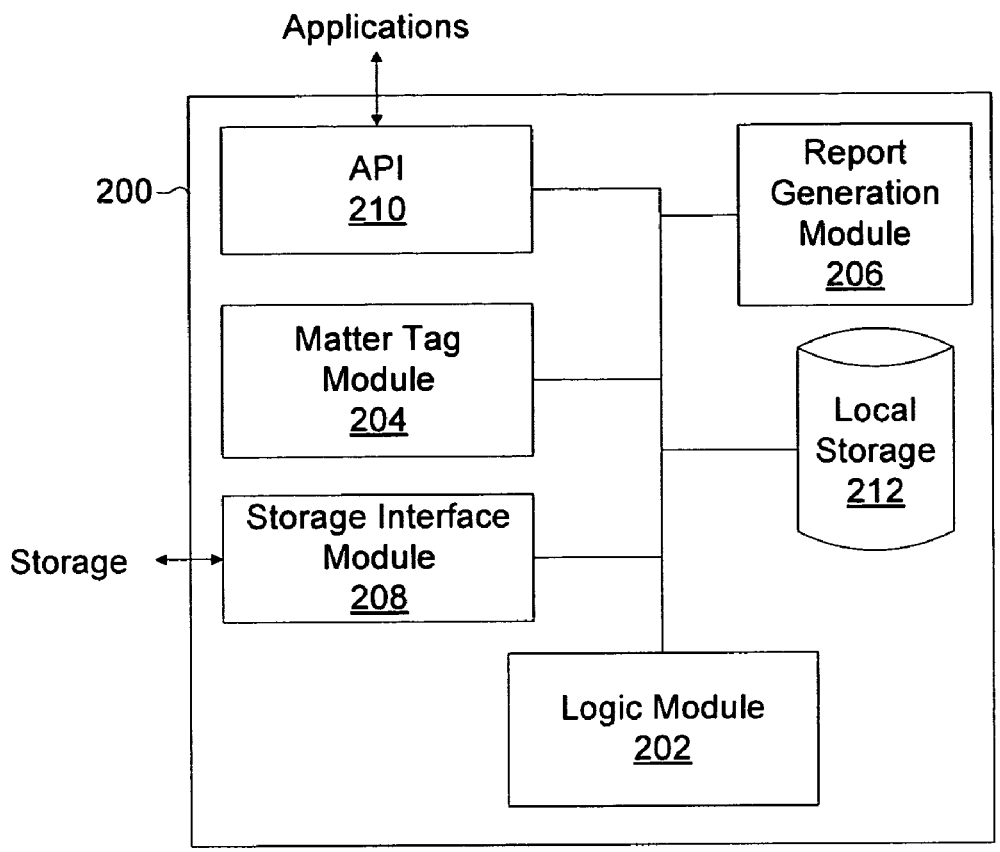
FIG. 2A illustrates an exemplary organizational data system.
FIG. 2B illustrates an exemplary application layer schema.

FIG. 2A illustrates an exemplary organizational data system. Here, system 200 includes logic module 202, matter tag module 204, display module 206, storage interface module 208, application programming interface ("API") 210, and local storage repository 212. System 200 may be implemented as software, hardware, circuitry, or a combination thereof. As software, system 200 may be implemented as an application developed using structured and unstructured programming and formatting languages such as C, C++, C#, object C, Java, Cobol, Fortran, binary, machine assembly, HTML, XML, XHTML, and others. System 200 is not limited to the type of languages used and the described techniques may be implemented using different types of languages, including those described above and others. In some examples, system 200 may be in data communication with other modules, applications, systems, and the like. Here, API 210 is in data communication with other applications that may be implemented on a client (e.g., clients 104-106 (FIG. 1)). Storage interface module 208 is used to store and retrieve data in a remote storage repository (not shown) that may also be installed on the same client or in a different (i.e., remote) location. For example, data may be stored in another database, data repository, storage area network, data warehouse, or other data storage and retrieval system located elsewhere. Data, as used herein, may refer to organizational data that is stored and retrieved for analysis and management purposes using the techniques described herein. Likewise, organizational data may be structured or unstructured data that is used by an organization for a given purpose such as communication (e.g., e-mail), project management (e.g., documents, tasks, calendars, reminders, Gantt charts, and the like), resource management (e.g., spreadsheets, and the like), and others. In other examples, organizational data may be handled differently.

Here, logic module 202 may be configured to provide instructions to and direct system 200 to analyze and manage organizational data. For example, logic module 202 may, via API 210, detect an item that invokes a rule, policy, or other parameter stored in local storage 212. The rule, policy, or other parameter may determine how the item is to be handled, including invoking matter tag module 204 to embed a matter tag with the item and sending the associated item to be stored in a remote location using storage interface module 208. Further, if a search or other type of request is made using a given project name, client name, matter name, date range, type of item, or other parameter, then report generation module 206 may be used to generate a report or display on a user interface that lists the item, provides a hyperlink ("link") to the item, and, when the link is clicked on, the associated item may be launched in its native application format from a user interface provided for system 200. In some examples, a user interface may be provided or displayed ("provided") that presents organizational data and information in a useful context while enabling items to be presented or provided in their native application formats without requiring the use of separate, different applications, thus improving efficiency and reducing costs. Further, by using matter tags embedded by matter tag module 204, items may be quickly located and provided by system 200. System 200 and the above-described components may be varied and are not limited to the examples provided.

FIG. 2B illustrates an exemplary application layer schema for organizational data analysis and management. Here, organizational data analysis and management system 200 is layered "on top" of e-mail application 222, office productivity application 224, and project application 226. In some examples, organizational data analysis and management system 200, e-mail application 222, office productivity application 224, and project application 226 may be substantially similar to system 200 (FIG. 2A) and may be implemented interchangeably. Organizational data analysis and management system 200 may be implemented as software, hardware, circuitry, or a combination thereof. As software, system 200 may be implemented as an application developed using structured and unstructured programming and formatting languages such as C, C++, C#, object C, Java, Cobol, Fortran, binary, machine assembly, HTML, XML, XHTML, and others. System 200 is not limited to the type of languages used and the described techniques may be implemented using different types of languages, including those described above and others. E-mail application 222 may be implemented as an application on a client, server, as a web service, or the like. Office productivity application 224 may include word processing, calendaring, presentation and graphics design, and other similar types of applications. Project application 226 may be implemented as an application to track, manage, allocate, or otherwise work with resources, personnel, materials, materiel, and the like. In other examples, e-mail application 222, office productivity application 224, and project application 226 may be implemented differently and are not limited to the examples given.

Organizational data analysis and management system 200 may be implemented, integrated, or included with e-mail application 222, office productivity application 224, and project application 226 in order to enable organizational data analysis and management techniques such as those described herein. Organizational data analysis and management system 200 may be implemented with one, some, none, all, more, or fewer of e-mail application 222, office productivity application 224, and project application 226. Structured and unstructured data may be exchanged between organization data analysis and management system 200 and each of e-mail application 222, office productivity application 224, and task/project application 226. In other examples, organizational data analysis and management system 200 may be varied and is not limited to the descriptions provided.

Figure 3:
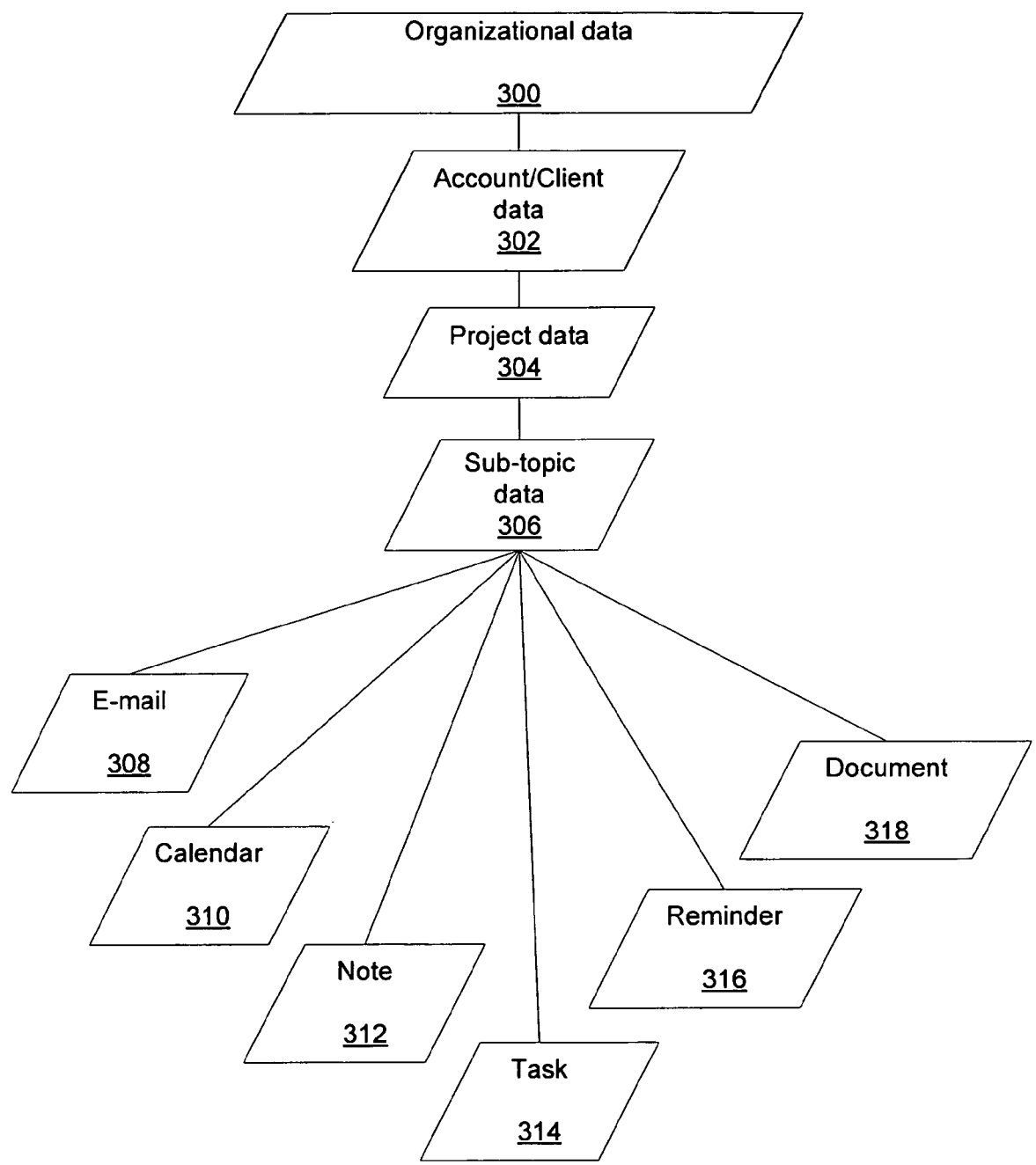
FIG. 3 illustrates an exemplary data types associated with a matter.

FIG. 3 illustrates an exemplary data hierarchy for organizational data analysis and management. Here, types of organizational data 300 are shown, including account/client data 302, project data 304, sub-topic data 306, e-mail data 308, calendar data 310, note data 312, task data 314, reminder data 316, and document data 318. Project data 304 may be a superset of data that includes, but is not limited to, sub-topic data 306, e-mail data 308, calendar data 310, note data 312, task data 314, reminder data 316, document data 318, and others. Further, project data 304 may also be a set of data (i.e., structured or unstructured) that belongs to a larger superset of data. For example, a superset of data that includes project data 304 may be account/client data 302. In service-oriented industries and organizations (e.g., legal, medical, accounting, consulting, and the like), organizational data 300 may be data and information that is used to describe clients or accounts (i.e., account/client data 302), projects performed for those clients or accounts (i.e., project data 304), and sub-projects (i.e., sub-topic data 306) belonging to projects. In some examples, "account," "client," and "matter" may be used interchangeably to describe a given superset of data (e.g., account/client data 302).

Within each sub-project, items (e.g., e-mail data 308, calendar data 310, note data 312, task data 314, reminder data 316, and document data 318) may be further classified based on the above-described hierarchy. In other industries (e.g., product-based such as manufacturing, commercial, industrial, and others), different types of data may be used to classify organizational data. Classification of data types may be implemented using the techniques described herein, including the use of matter tags that are configured with logic for classifying and organizing organizational data. Other types of organizational data may be analyzed, managed, and used apart from those shown and described and are not limited to the examples shown.

Figure 4:
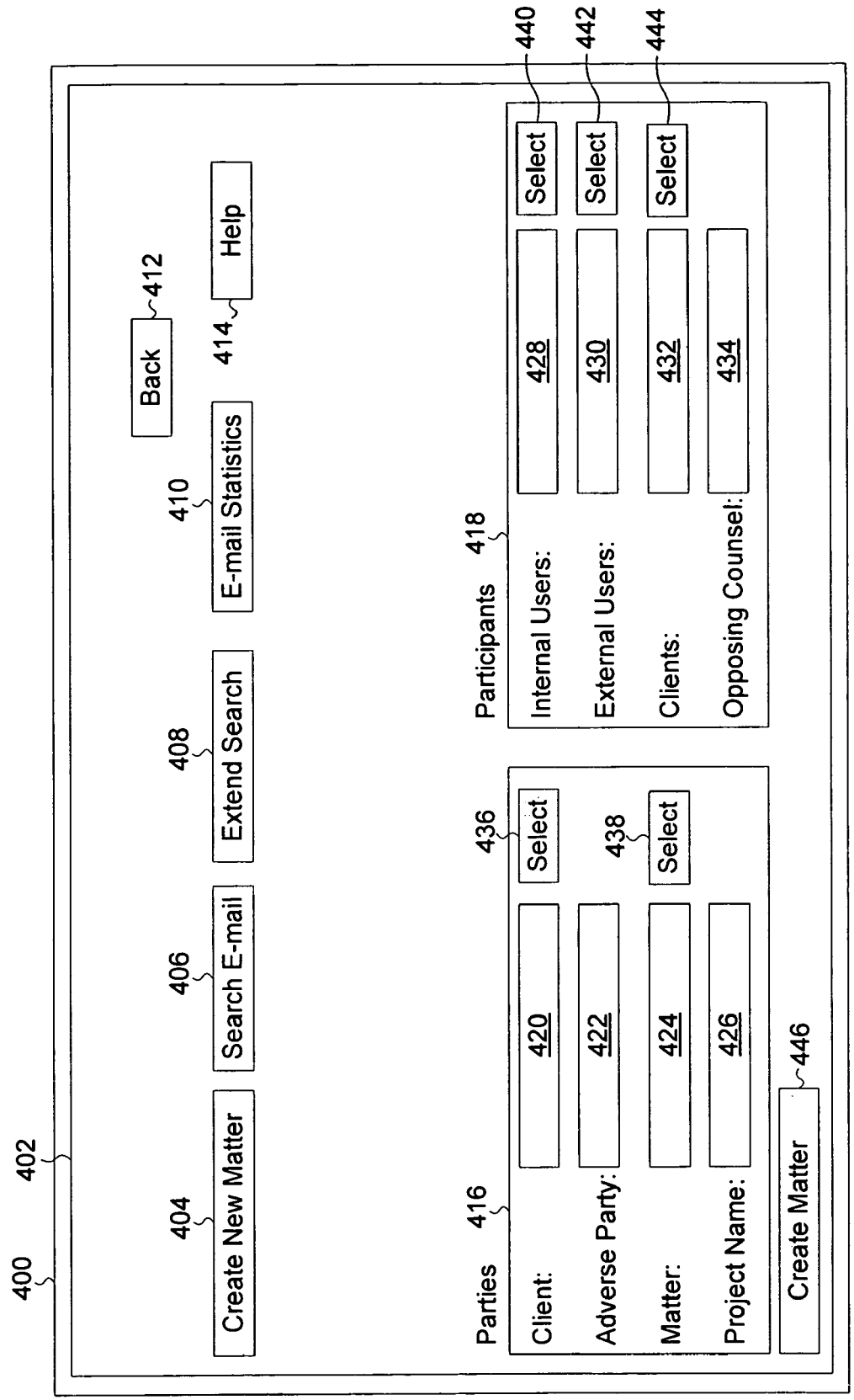
FIG. 4 illustrates an exemplary user interface for organizational data analysis and management.

FIG. 4 illustrates an exemplary user interface for organizational data analysis and management. Here, interface 400 includes display 402, buttons 404-414 and 436-446, Parties sub-display 416, Participants sub-display, and fields 420-434. Interface 400 is an example of a type of interface that may be used for organizational data analysis and management as in, for example, a legal organization. Interface 400 may be varied for different organizations, industries, or applications beyond those described herein. In some examples, interface 400 may be implemented by system 200 (FIG. 2A) to perform organizational data analysis and management for a legal organization (e.g., law firm, in-house legal department, governmental legal agency, non-profit or public interest law group, and the like). Legal organizations may have substantial demands and challenges to find and produce comprehensive organizational data about a particular client or project (i.e., matter). Legal organizations may use interface 400 to find and display the comprehensive organizational data and related items and also allow the items to be executed, launched, or opened in their native formats using system 200 (FIG. 2A). In other examples, interface 400 may be implemented differently and is not limited to the examples provided.

As an example, interface 400 may be used to analyze, manage, organize, create new matters, and search organizational data. Here, interface 400 may be provided to analyze, manage, organize, create new matters, and search e-mails (i.e., a given type of organizational data). Buttons 404-414 may be "depressed" or interacted with by using a direct input device (e.g., mouse). When depressed or interacted, a new matter may be created (i.e., pressing button 404), e-mails may be searched (i.e., depressing button 406), extended searches of e-mails may be performed (i.e., depressing button 408), statistics may be gathered and displayed graphically or non-graphically (i.e., depressing button 410), previous displays may be viewed (i.e., depressing button 412), or help may be sought (i.e., depressing button 414). When depressed, buttons 404-414 may launch different displays with different options, enabling a user to perform a function related to the higher-level functions presented by buttons 404-414.

For example, when creating a new matter, a user may enter information related to the new matter in fields 420-434. In some examples, information about a Party (i.e., client) including the client name, adverse party name, matter, and project name may be entered in fields 420-426. Other information about other Participants (i.e., other parties that may be involved or related to the matter) may be entered in fields 428-434, including internal users names, external users names, clients, and opposing counsel. In other examples, more, less, or different information may be provided and are not limited to the examples shown. Information entered in fields 420-434 may be used to create a matter and, when items are detected that are related to the information entered, matter tags may be generated and embedded in the items. In some examples, matter tags may be e-mail addresses that are generated when a matter is created. The matter tags and generated e-mail addresses are used to associate items (e.g., e-mails, calendars, notes, tasks, reminders, documents, and others) with a given matter. Further, when the items are retrieved, for example, during a search, logic in the matter tag enables a copy of the item to be retrieved from storage location or address and launched in its native format from interface 400, avoiding the use of multiple applications to view a single item. When a search is performed, interface 400 may be changed to display different options, data, information, items, and the like to support a given association. Interface 400 may be varied and is not limited to the implementation examples shown above. For example, more, fewer, or different fields may be used to replace or supplement fields 420-434. For example, a manufacturing organization may substitute field 420 with another field that specifies the name of a supplier or OEM provider. As another example, a government organization may substitute field 420 with the name of a contractor that is supplying products or services. In still other examples, the above-described features and functionality associated with interface 400 may be varied, replaced, supplemented, deleted, or other modified. Examples of interface 400 for use in a legal organization are described in greater detail below in connection with FIGS. 5A-5D.

Figure 5A:
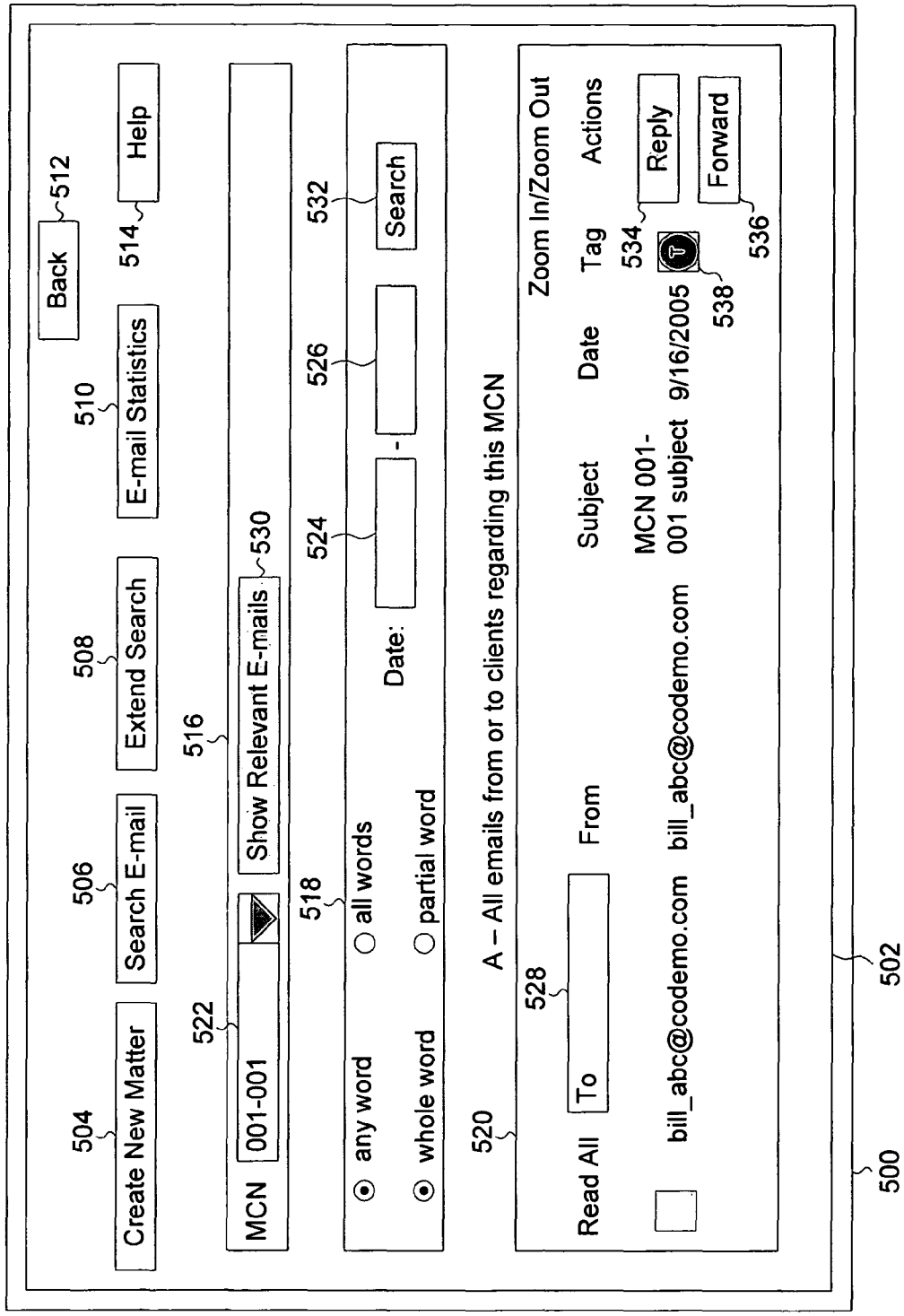
FIG. 5A illustrates an alternative exemplary user interface for organizational data analysis and management.

FIG. 5A illustrates an alternative exemplary user interface for organizational data analysis and management. Here, interface 500 includes display 502, buttons 504-514 and 530-536, sub-displays 516-520, pulldown menu 522, fields 524-528, and tag icon 538. In some examples, interface 500 may be provided to display items (e.g., e-mails) that are sent to or from a client for a given matter (i.e., matter control number (MCN)), which may be selected from pulldown menu 522 and submitted by clicking on button 530. In other examples, additional information or parameters may be entered to refine a search. For example, a date range may be entered in fields 524-526 and clicking on button 532. When submitted, items are produced in a search result according to the matter control number selected from pulldown menu 522 and the date range entered in fields 524-526. Items produced in the search result may be displayed in sub-display 520.

Here, listings describing items that relate to the parameters entered in sub-displays 516-518 are displayed in sub-display 520 as a search result. Additionally, sub-display 520 may be configured to include a sender's e-mail address (e.g., "bill_abc@codemo.com"), destination e-mail address (e.g., "sam_abc@codemo.com"), subject, date of transmission, tag (e.g., tag icon 538, which may be used to indicate the type of item), and provide buttons 534-536 for other actions that may be selected (e.g., "Reply" to or "Forward" the e-mail). In some examples, other actions or different information may be provided in sub-display 520. Further, interface 500 may be varied in appearance, information, content, and functionality and is not limited to the examples shown and described.

Figure 5B:
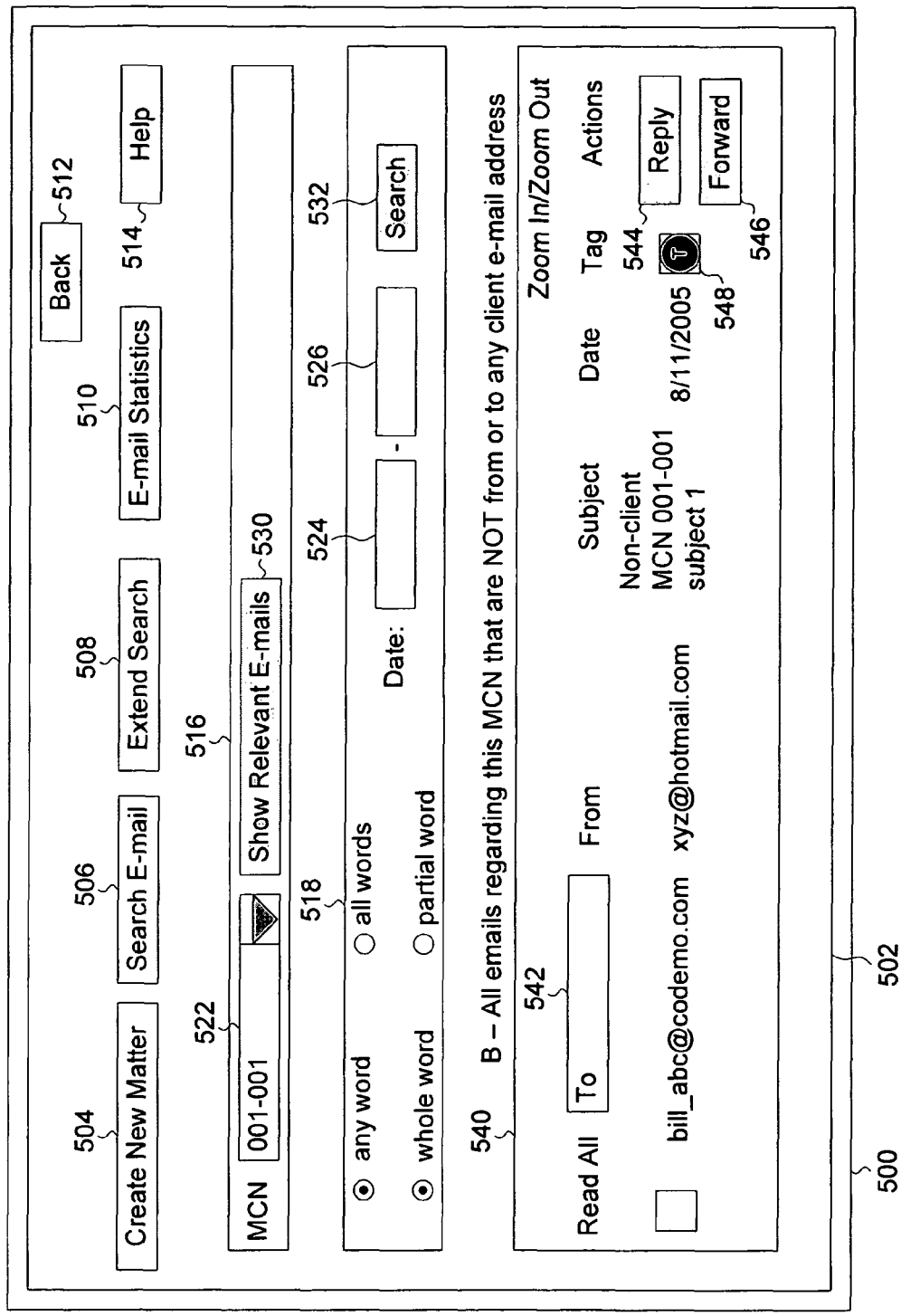
FIG. 5B illustrates another alternative exemplary user interface for organizational data analysis and management.

FIG. 5B illustrates another alternative exemplary user interface for organizational data analysis and management. Here, interface 500 includes display 502, buttons 504-514, 530-532, and 544-546, sub-displays 516-518 and 540, pull-down menu 522, fields 524-526 and 542, and tag icon 548. In some examples, interface 500 may be provided to display items (e.g., e-mails) that relate to a matter (i.e., MCN), but are neither sent from or to a client e-mail address. Entering a MCN using pulldown menu 522 and/or a date range using fields 524-526 and clicking on button 532 generates a search. Results of the search may be displayed in sub-window 540, as shown in the example.

A listing of items that meet the search criteria entered in sub-displays 516-518 may be generated and displayed in sub-display 540. Information such as a destination e-mail address, sending e-mail address, subject, date, tag icon 548, and additional actions using buttons 544-546 are shown. As an example, an e-mail from "bill_abc@codemo.com" to "xyz@hotmail.com" is found and displayed as a search result in sub-display 540. Additional actions may be taken, including replying to the e-mail listed by clicking on button 544 or forwarding the e-mail by clicking on button 546. Further, tag icon 548 may be used to identify the type of item or whether the item has been tagged (i.e., "T" on tag icon 548). In other examples, different information may be shown in sub-display 540. Further, interface 500 may be varied in appearance, information, content, and functionality and is not limited to the examples shown and described.

Figure 5C:
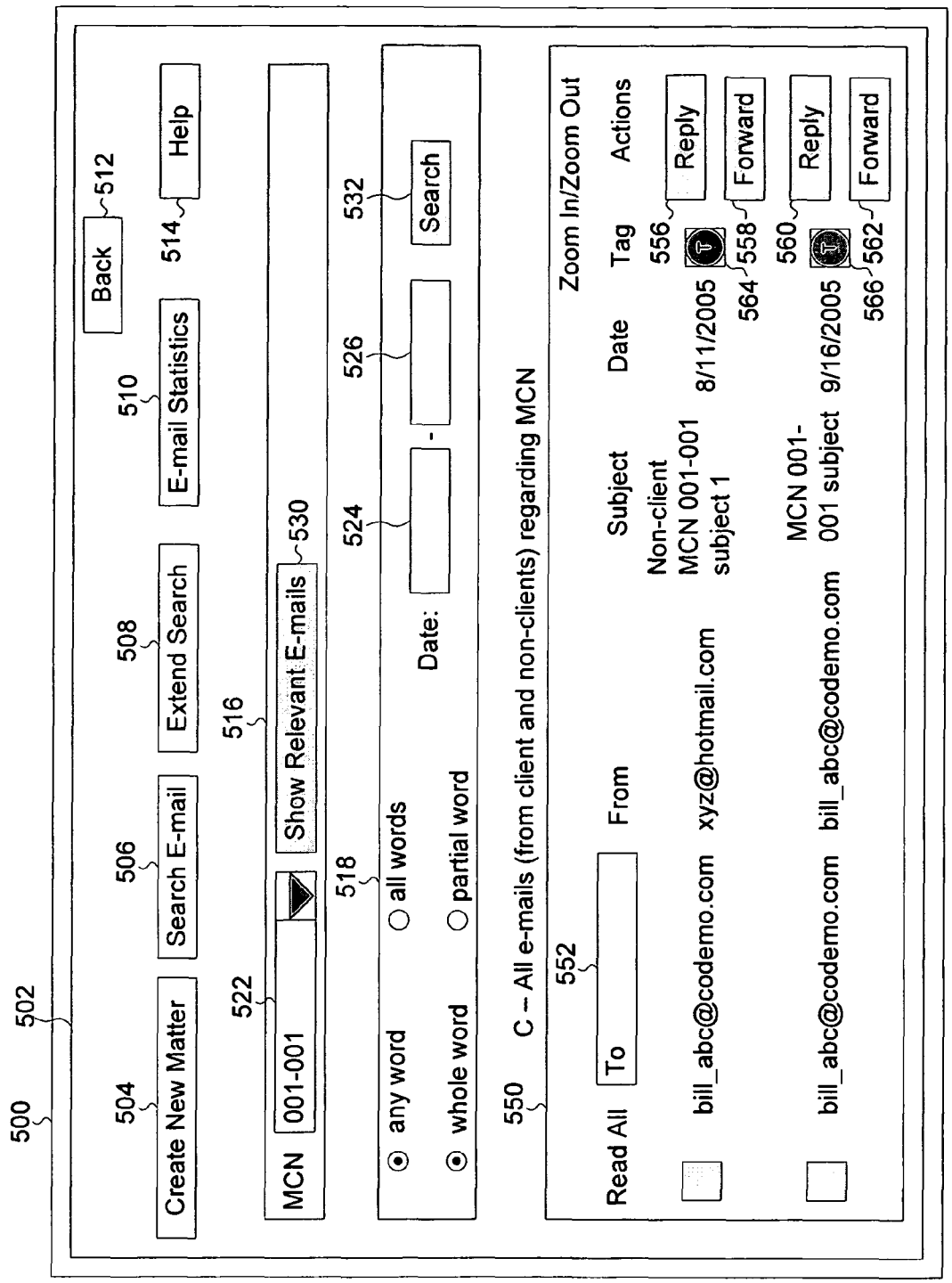
FIG. 5C illustrates yet another alternative exemplary user interface for organizational data analysis and management.

FIG. 5C illustrates yet another alternative exemplary user interface for organizational data analysis and management. Here, interface 500 includes display 502, buttons 504-514, 530-532, and 556-562, sub-displays 516-518 and 550, pull-down menu 522, fields 524-526 and 552, and tag icons 564-566. In some examples, interface 500 may be provided to display items (e.g., e-mails) that relate to a matter (i.e., MCN), including items that may have been exchanged between clients and non-clients alike. By using pulldown menu 522 and/or date range 524-526, a search may be submitted for items that relate to a matter, including those items exchanged between clients and non-clients alike. In some examples, data entered in field 552 may be modified to re-sort and organize search results shown in sub-display 550. For example, the search result listing may resort and organize items (e.g., e-mails) shown in display 550 by entering "From" instead of "To" in field 552. Likewise, other entries such as "To," "cc," "bcc," and others may be entered in field 522.

Items listed in sub-display 550 may be displayed along with actions that may be taken (e.g., replying or forwarding the item, and others) by using buttons 556-562. Additionally, tag icons 564-566 may be changed or displayed differently to provide additional information about the type of item, whether the item has been tagged (i.e., associated with a matter), and others. In other examples, different information may be shown in sub-display 550. Further, interface 500 may be varied in appearance, information, content, and functionality and is not limited to the examples shown and described.

FIG. 5D illustrates yet another alternative exemplary user interface for organizational data analysis and management. Here, interface 500 includes display 502, buttons 504-514, 530-532, and 574-576, sub-displays 516-518 and 570, pull-down menu 522, fields 524-526 and 572, and tag icon 578. In some examples, interface 500 may be provided to display items (e.g., e-mails) that may also be relevant to a matter (i.e., MCN) that were not previously associated with a MCN in the examples described above in connection with FIGS. 5A-5C. In some examples, a MCN may be entered using pulldown menu 522. Additionally, a date range may be entered in fields 524-526 and, when button 530 is clicked, items (e.g., e-mails) having a matter tag that indicates an association with a MCN and falling within the entered date range, if any, are listed in sub-display 570. Further, additional search criteria may be selected using the "radio" button shown in the left side of sub-display 518. When selected, the options shown, in connection with the information entered in fields 420-434 (FIG. 4), produces a search result list of items that may be related to a given MCN. Interface 500 may be varied in design, functionality, appearance, and implementation and is not limited to the examples described above. Further, the examples described above in connection with FIGS. 5A-5D may be displayed together in a vertically-configured single window. A user can view the above-described organizational data by scrolling vertically through interface 500. In other examples, the above-described examples may also be configured in a horizontally-contiguous fashion.

Figure 6A:
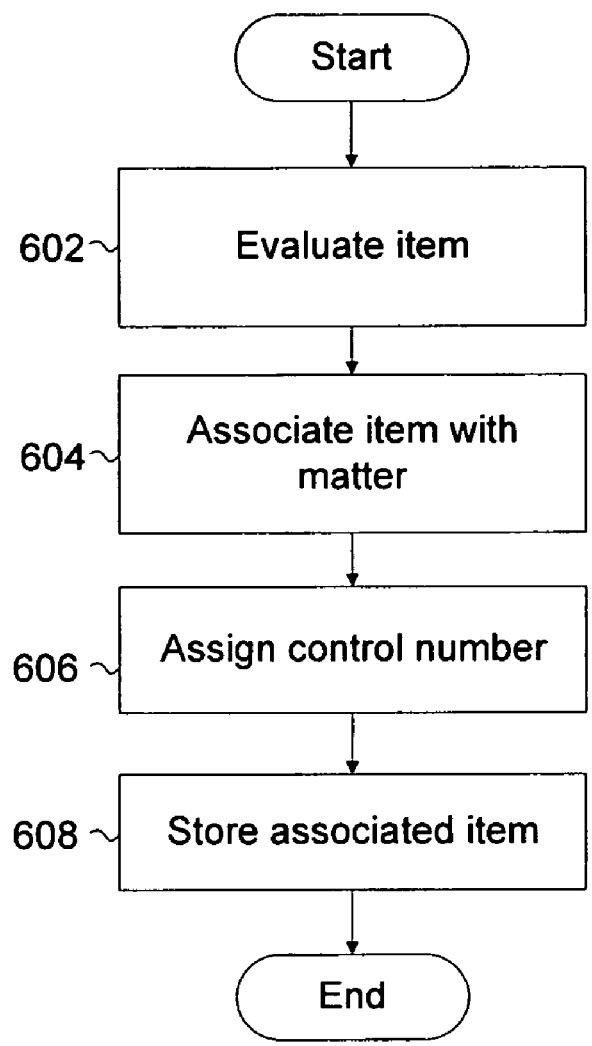
FIG. 6A illustrates an exemplary overall process for organizational data analysis and management.

FIG. 6A illustrates an exemplary overall process for organizational data analysis and management. Here, an example of organizational data analysis and management in a legal organization is described. Other examples of organizations and industries may be used and the below-described processes are not limited to the examples provided. In some examples, an item is evaluated for association with a matter (602). Evaluating an item may include creating (i.e., authoring), receiving, sending, reviewing, or other operations that may be performed with regard to individual items having organizational data. In some examples, an item may be evaluated using a first system or application (e.g., organizational data analysis and management system 220 (FIG. 2B). In other examples, an item may be evaluated using a second system individually or in combination with the first system. In other words, an item may be evaluated from an application (e.g., organizational data analysis and management system 220 (FIG. 2B) while using a native application in which the item was created or modified. An item may be created in a native application (e.g., an e-mail, word processing, or other type of application) in data communication with organizational data analysis and management system 220 (FIG. 2B). For example, when an item is created (i.e., authored), a native application is launched to create the item and automatically establish an association between the item and a matter. As another example, an item may be received by organizational data analysis and management system 220 after it was authored in a native application. After an item is evaluated, the item is associated with a matter (604). As an example, an association may be established by entering data associated with or identifying the item in a table that is used (i.e., when a search is performed) for the matter to retrieve associated items. In other examples, different types of data structures may be used to store data that indicates an association between an item and a matter.

An association may result in a "tagged item" (i.e., an association between an item and a matter is established if the item meets a pre-determined classification, which results in an assigned matter tag being embedded with the item). In other examples, an association may result if, due to "fuzzy classification" rules, logic, or parameters ("classification logic"), an association is found to exist between the item and an existing matter (i.e., project). Associations may be made by embedding or assigning a matter tag with the item. The matter tag may be embedded or assigned as a "wrapper" or additional data that is included with the item or appended to header data or metadata that indicates the type of item, whether the item should be associated with a matter and, if a search is performed in which the item is delivered as a search result, how the item should appear in an interface using processes such as those described above in connection with FIGS. 5A-5D. Matter tags may be embedded as encrypted or unencrypted data to meet various levels of data security for an organization. Further, classifications may be used to establish a type of the item, which may be indicated using either assigned matter tags or determined as a result of applying "fuzzy classification" rules or logic that determine whether an item is associated with a matter and what type of classification should be assigned to items that do not fall within assigned matter tag pre-determined classification categories. Examples of "fuzzy classification" logic or rules are described in greater detail below in connection with FIGS. 6B-6E.

Here, classification may be performed automatically, semi-automatically, or manually through an interface. In some examples, classification may be performed to provide an association between an item and a matter based on the type of item as determined from data analyzed contained in the document. As an example, an e-mail may include text such as a client's name, a matter or project name, or other information that, once detected, enables matter tags to determine how to handle an item.

For example, a matter tag may include data formatted as "XXX-YYY-E", which may represent an account or client number (i.e., the first three characters "XXX"), a matter or project number (i.e., the second three characters "YYY"), and the type of item (e.g., "E" for e-mail, "D" for document, "T" for task, and the like). As another example, matter tags may also include an individual system e-mail address, to which a copy of the associated item is sent. Once sent to the individual system e-mail address, items are assembled, regardless of their native format and, when a search is performed that includes parameters or keywords that match those of the items stored in a given individual system e-mail address, all of the items are delivered in a search results listing. Once listed, items may be selected and launched in their respective native applications from within an interface (e.g., interface 500 (FIGS. 5A-5D) provided by system 200 (FIG. 2A). In other examples, matter tags may be implemented differently and are not limited to the examples provided. Matter tags are embedded with items to provide associations between the associated items and matters that are created using system 200 (FIG. 2A) through an interface such as interface 500 (FIG. 5A). Association of items with matters is discussed in greater detail below in connection with FIGS. 6B-6F.

Referring back to FIG. 6A, once an item has been associated, the item may be assigned a control number (606). In some examples, a control number may be used to index, store, or retrieve an item stored in storage 120 (FIG. 1). After a control number has been assigned, the item may be stored (e.g., in storage 120 or another data repository) (608). In other examples, the above-described process may be varied in design, implementation, execution, and is not limited to the examples provided.

Figure 6B:
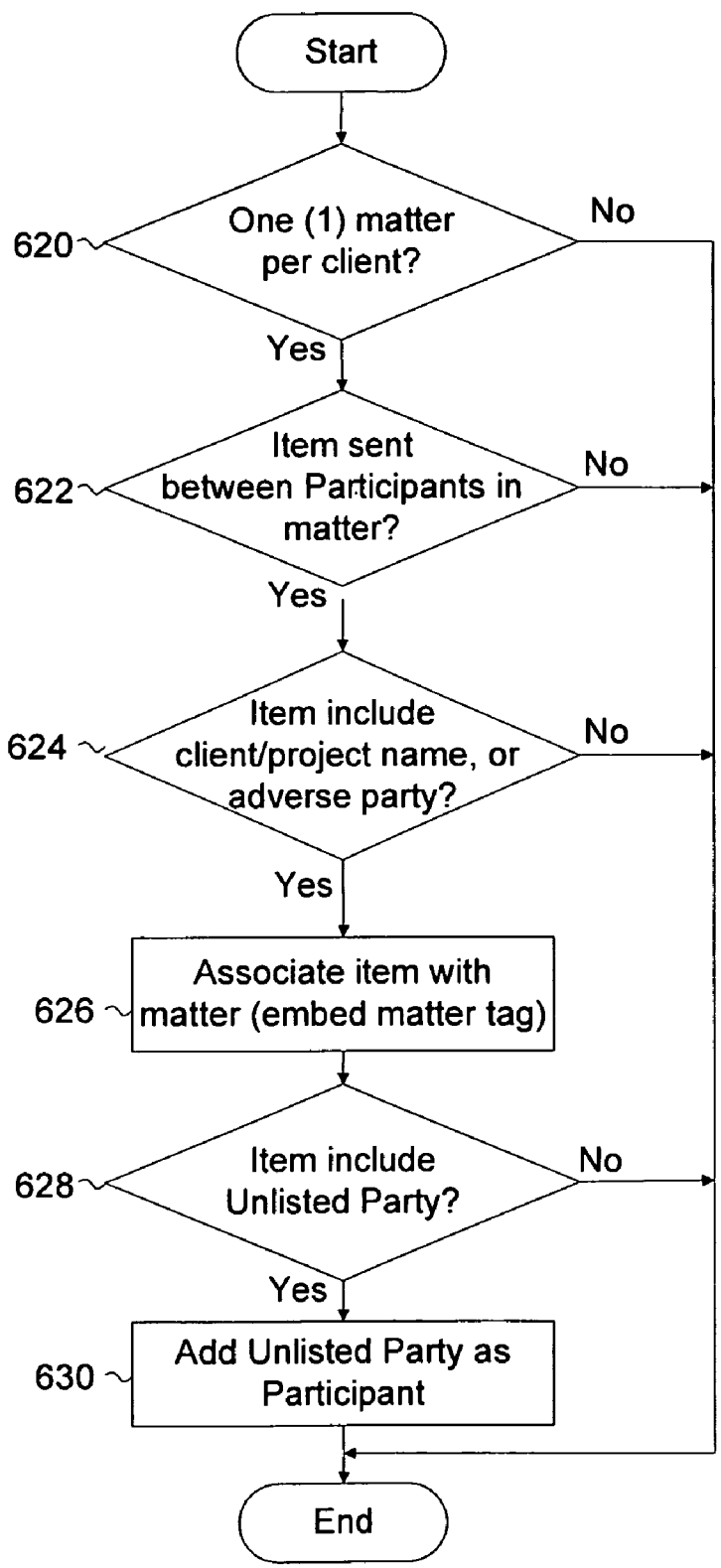
FIG. 6B illustrates an exemplary sub-process for associating an item with a matter.

FIG. 6B illustrates an exemplary sub-process for associating an item with a matter. Here, an example of a "fuzzy classification" logic, rule or parameter that may be used for associating an item with a matter for a legal organization is described (e.g., 604 (FIG. 6A)). Other types of organizations may use substantially similar processes and are not limited to the examples described. Here, a determination is made as to whether there is one (1) matter per client (620). In other examples, different numbers of matters per client may be made. If more than one matter per client is determined, then the sub-process ends and is handled differently (e.g., FIG. 6C). If one matter per client is determined, then a determination is made as to whether an item was sent between participants in the matter (622). A participant may be an entity such as an individual or organization that either sent or received the item. For example, if the item is an e-mail, participants may include the sender and receiver. Participants may also include users whose e-mail addresses were added as "cc" or "bcc" recipients. Other parties who are not classified as participants, but who are included or referred to in an item for a matter may be identified as "Unlisted Parties" that may be classified as participants if other criteria are met, as described below.

If an item was not sent between participants, then the sub-process ends. However, if the item was sent between participants, then a determination is made as to whether the item includes information such as the client or project name or the name of an adverse party (624). If an item includes information such as the client or project name or the name of an adverse party, then the item is associated with the matter (626). If the item does not include a client, project, or adverse party name, then the sub-process ends. If the item is associated with the matter under consideration (i.e., the matter is identified in pulldown menu 522 of FIGS. 5A-5D), then a determination is made as to whether an unlisted party is referred to by the item, as described above (628). If an unlisted party is described, then the unlisted party is added as a participant and the matter tag may be used to further classify future items received from the participant (630). If the item does not refer to an unlisted party, then the sub-process ends. In some examples, "fuzzy classification" logic, rules, or parameters may be implemented differently than as described above. Logic, rules, or parameters that are used to implement "fuzzy classification" logic may be established by system default, manually entered, manually customized, automatically or semi-automatically customized, modified based on user intervention, or otherwise modified beyond the descriptions provided above. In some examples, customization of "fuzzy classification" logic, rules, or parameters may vary the accuracy of a search, particular when a user is searching for particular items associated with a given matter. The above-described sub-process may be varied and is not limited to the examples provided.

Figure 6C:
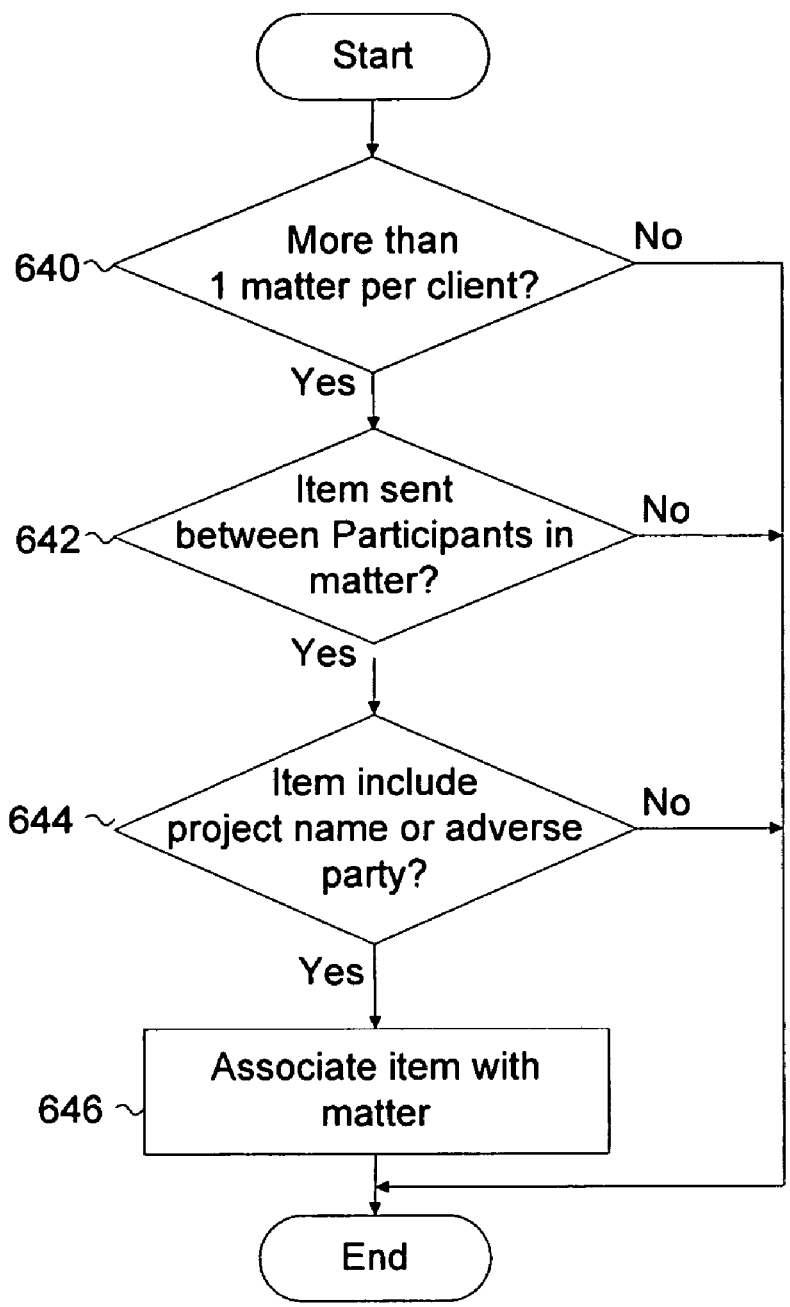
FIG. 6C illustrates an alternative exemplary sub-process for determining whether to associate an item with a matter.

FIG. 6C illustrates an alternative exemplary sub-process for determining whether to associate an item with a matter. Here, another example of a sub-process that may be used for associating an item with a matter (e.g., 604 (FIG. 6A)) is described. A determination is made as to whether more than one (1) matter per client exists (640). If more than one matter per client does not exist (i.e., one matter per client or no matters per client), then the sub-process ends. However, if more than one matter per client exists, then a determination is made as to whether the item was sent between participants in a matter (642). If the item was sent between participants in a matter, then another determination is made as to whether the item includes the name of a project or adverse party (644), otherwise the sub-process ends. If the item includes the name of a project or adverse party, then the item is associated with the matter (646). In other examples, the above-described sub-process for associating items where more than one matter per client exists may be performed differently and is not limited to the examples provided above.

Figure 6D:
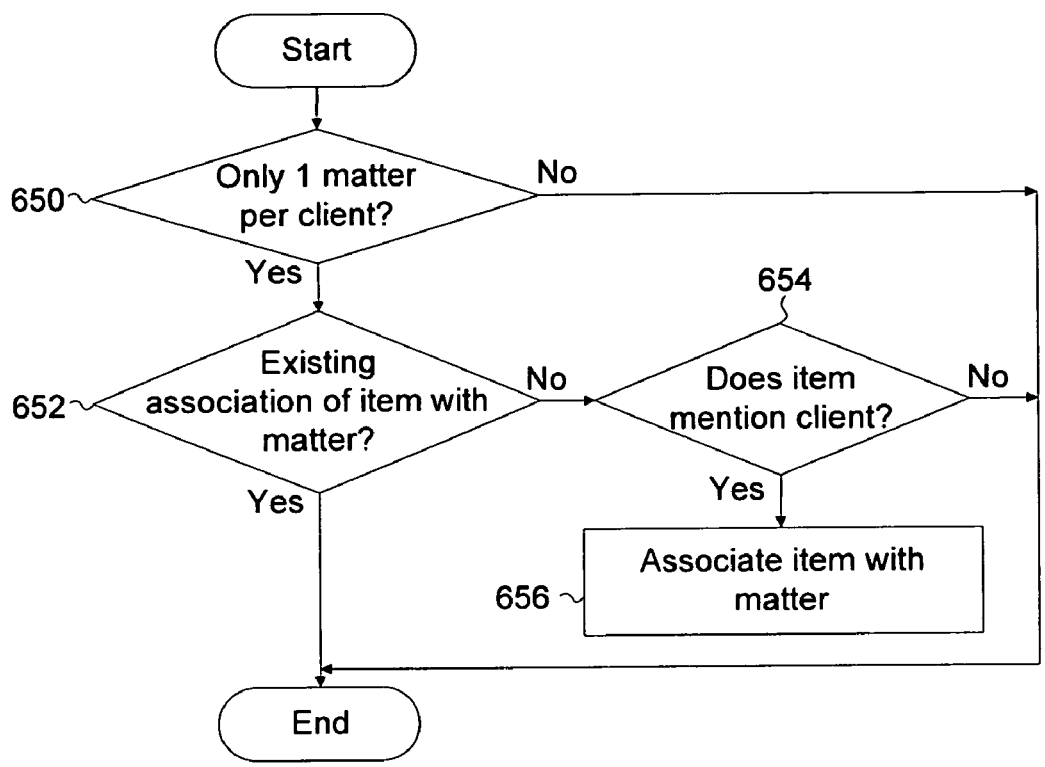
FIG. 6D illustrates another alternative exemplary sub-process for determining whether to associate an item with a matter.

FIG. 6D illustrates another alternative exemplary sub-process for determining whether to associate an item with a matter. Here, yet another example of a sub-process that may be used for associating an item with a matter (e.g., 604 (FIG. 6A)) is described. In some examples, a determination is made as to whether one (1) matter per client exists (650). If one (1) matter per client does not exist (e.g., no matters per client or more than one (1) matter per client exists), then the sub-process ends. However, if one (1) matter per client exists, then another determination is made as to whether there is an existing association of the item with a matter (652). As an example, an existing association may be determined by detecting the presence of a previously-embedded matter tag that is used to associate the item with a matter. In other examples, an existing association may be determined differently. If an existing association does exist, then the sub-process ends. However, if an existing association does not exist, then a determination is made as to whether the item mentions (e.g., includes data or information that identifies a client) a client (654). If no mention of a client is found, then the sub-process ends. However, if the item does mention a client, then the item is associated with a matter, which may be performed, in some examples, by embedding a matter tag, as described above (656). In other examples, the above-described sub-process may be varied and is not limited to the examples described.

Figure 6E:
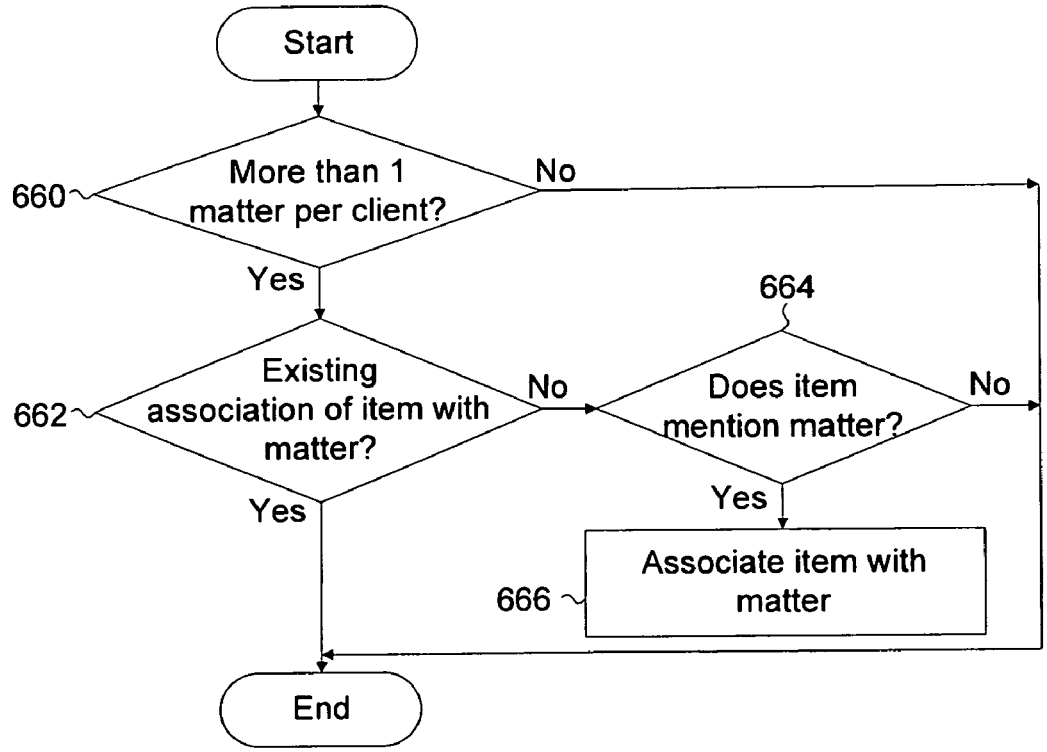
FIG. 6E illustrates yet another alternative exemplary sub-process for determining whether to associate an item with a matter.

FIG. 6E illustrates yet another alternative exemplary sub-process for determining whether to associate an item with a matter. Here, still another example of a sub-process that may be used for associating an item with a matter (e.g., 604 (FIG. 6A)) is described. A determination is made as to whether more than one (1) matter per client exists (660). If more than one (1) matter exists, then a determination is made as to whether an existing association of the item with a matter exists (662). Otherwise, the sub-process ends. Further, if an existing association of the item with a matter exists, then the sub-process also ends. However, if no existing association is found, then a determination is made as to whether the item mentions the matter under consideration (i.e., being analyzed) (664). If the item does not mention the matter under consideration, then the sub-process ends. However, if the item does mention the matter under consideration and no previous association exists, then the item is associated with the matter (666). In other examples, the above-described sub-process may be varied and is not limited to the descriptions provided.

Figure 6F:
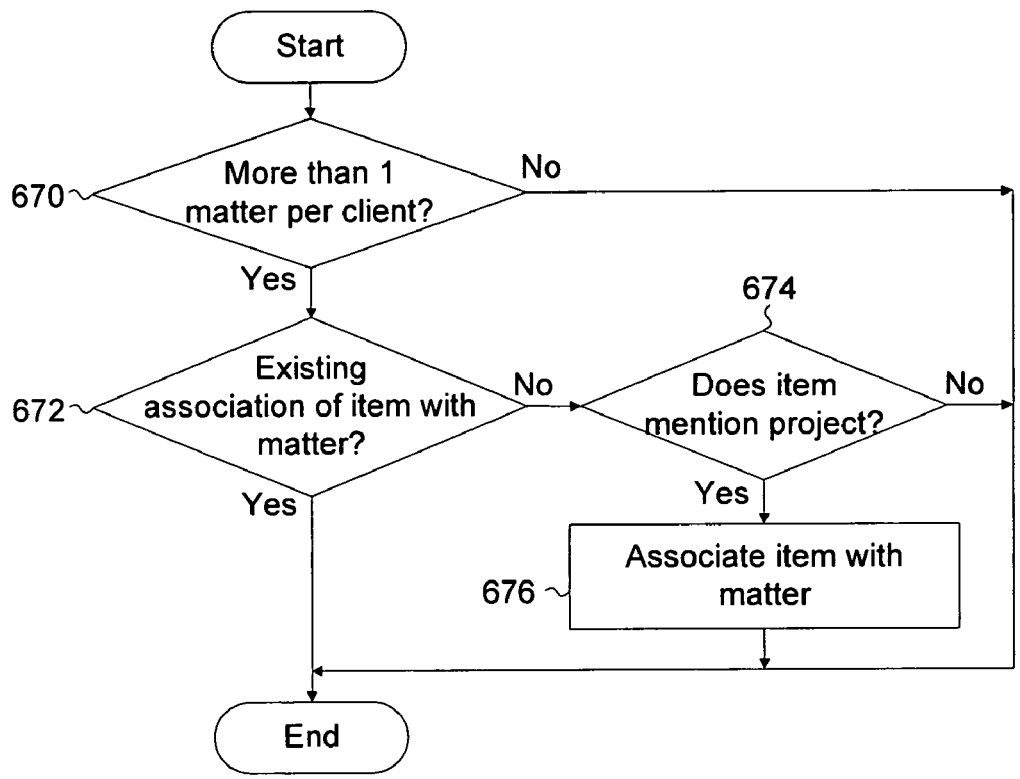
FIG. 6F illustrates a further alternative exemplary sub-process for determining whether to associate an item with a matter.

FIG. 6F illustrates a further alternative exemplary sub-process for determining whether to associate an item with a matter. In some examples, a determination is made as to whether more than one (1) matter per client exists (670). If more than one (1) matter per client exists, then a determination is made as to whether an existing association of an item with a matter exists (672). Otherwise, the sub-process ends. However, if more than one matter per client exists and no previous association of the item with the matter under consideration exists, then a further determination is made as to whether the item mentions a project (674). If the item does not mention a project, then the sub-process ends. However, if the item does mention a project and no previous association between the item and the matter under consideration was made, then the item is associated with the matter under consideration, which may be performed by either using an assigned matter tag or applying "fuzzy classification" logic or rules, as described above (676). In other examples, the above-described sub-process may be varied and is not limited to the description provided.

Figure 7:
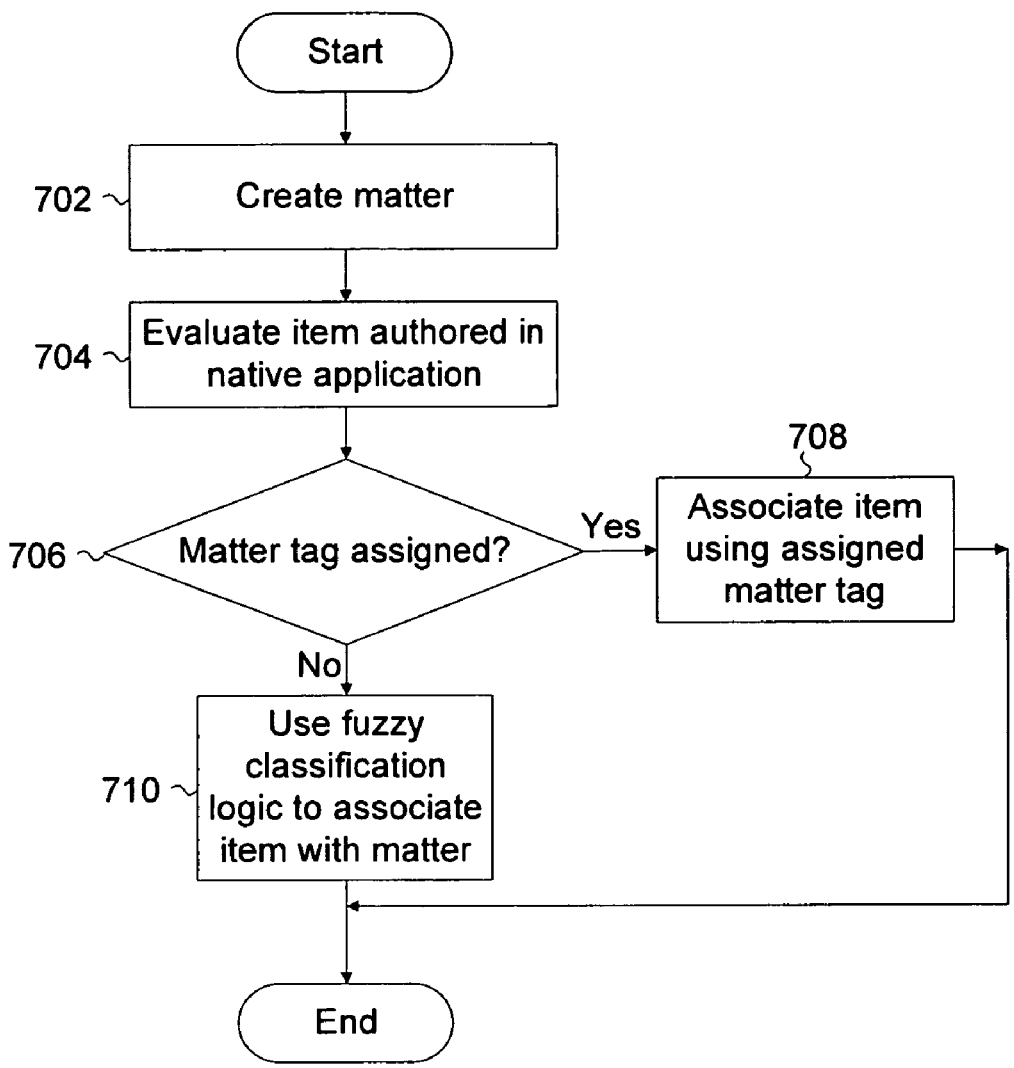
FIG. 7 illustrates an alternative overall process organizational data analysis and management.

FIG. 7 illustrates an alternative overall process organizational data analysis and management. In some examples, a matter, as described above, is created (702). Once a matter has been created an item is evaluated (704). In some examples, an item may be created in a native application using organizational data analysis and management system 220 (FIG. 2B). In other examples, an item may be received after being authored in a native application and then sent to organizational data analysis and management system 220. In other examples, items may be evaluated by organizational data analysis and management system 220 differently. An assigned matter tag may be a pre-defined, pre-set, system or manually-specified tag that can be customized for a given account, client, project, or matter. Assigned matter tags may be used when set classifications are desired for items associated with a given matter. An assigned matter tag or matter tag may be used to provide data and information to indicate an association between an item and a matter. In other words, a matter tag inherits identifying information (e.g., client name, matter name, project name, and other information that may be entered in fields 420-434 (FIG. 4)) based on the matter under which the item was created.

Here, the item is associated with the matter under consideration using the assigned matter tag and the process ends (708). However, if an item is received that does not have an embedded matter tag, then a determination is made as to whether "fuzzy" classification logic indicates that an item should be associated with a matter (710). As described above, "fuzzy" classification logic may refer to logic (e.g., logic module 202 (FIG. 2A)) that performs sub-processes such as those described above in connection with FIGS. 6B-6F to determine whether an item should be associated with a matter. In some examples, "fuzzy" classification logic may be performed by analyzing "source key words" contained in the items. For example, source key words may be found in data included in the content of an item or in metadata describing the item. If "fuzzy" classification logic determines that a matter tag should be assigned, then matter tag module 202 (FIG. 2A) associates the item with a matter using a matter tag (712).

Figure 8:
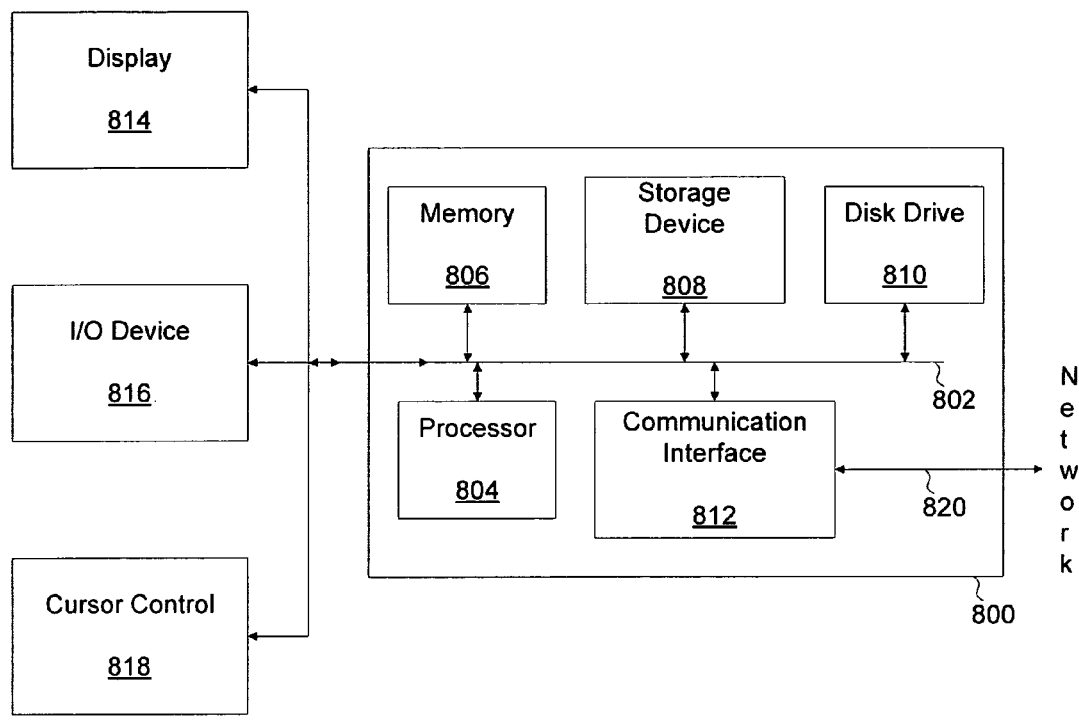
FIG. 8 illustrates an exemplary computer system suitable for organizational data analysis and management.

FIG. 8 illustrates an exemplary computer system suitable for organizational data analysis and management. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any physical medium that participates in providing instructions to processor 804 for execution. Such a medium may take many forms, including but not limited to, non-volatile media, volatile media, and transmission media. Non-volatile media includes, for example, optical or magnetic disks, such as disk drive 810. Volatile media includes dynamic memory, such as system memory 806. Physical transmission media includes coaxial cables, copper wire, and fiber optics, including wires that comprise bus 802.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method for managing organizational data, comprising:
    evaluating an item transmitted from a first location to a second location using a client-server network topology, the item comprising the organizational data, the item being created in a first application and having a first format, wherein a copy of the item is generated by a first server providing a physical operating environment for the first application;
    sending the copy of the item from the first server to a second server in data communication with the first server, the second server providing another physical operating environment for a second application, the second application being configured to analyze the copy of the item using a hierarchy of matter tags that are determined based on an industry;
    associating the copy of the item with a matter tag using the first server and the second server, the matter tag being associated with the hierarchy of matter tags based on a type or a classification, automatically associating the matter tag with the item using a matter tag module, the type or classification being determined based on the industry, wherein the matter tag indicates an item type, an item appearance when delivering the copy of the item in a search result, and an item classification when the copy of the item is not associated with one or more pre-determined classification categories;
    configuring, using the second server, the copy of the item for presentation on a client in an interface associated with the second application using a second format; and
    automatically classifying another item transmitted from the first location to the second location by associating another tag with the another item, wherein the another tag is determined by using classification logic configured to identify a contextual association between the another item and the item and by evaluating the organizational data included with the another item.

2. The method recited in claim 1, wherein associating the copy of the item is performed using an assigned matter tag.

3. The method recited in claim 1, wherein associating the copy of the item is performed using the classification logic.

4. The method recited in claim 1, further comprising embedding the matter tag in the item to associate the item with the matter.

5. The method recited in claim 4, wherein the matter tag is manually generated.

6. The method recited in claim 4, wherein the matter tag is automatically generated.

7. The method recited in claim 1, wherein the item is an e-mail.

8. The method recited in claim 1, wherein the item is a message.

9. The method recited in claim 1, wherein the item is a document.

10. The method recited in claim 1, wherein the item is an electronic document.

11. The method recited in claim 1, wherein the item is a task.

12. The method recited in claim 1, further comprising storing the item using the matter tag.

13. A system for managing organizational data, comprising:
    a memory configured to store the organizational data; and
    a processor configured to evaluate an item transmitted from a first location to a second location using a client-server network topology, the item comprising the organizational data, the item being created in a first application and having a first format, wherein a copy of the item is generated by a first server providing a physical operating environment, for the first application, to send the copy of the item from the first server to a second server in data communication with the first server, the second server providing another physical operating environment for a second application, the second application being configured to analyze the copy of the item using a hierarchy of matter tags that are determined based on an industry, to associate the copy of the item with a matter tag using the first server and the second server, the matter tag being associated with the hierarchy of matter tags based on a type or a classification, automatically associating the matter tag using a matter tag module, the type or classification being determined based on the industry, wherein the matter tag indicates an item type, an item appearance when delivering the copy of the item in a search result, and an item classification when the copy of the item is not associated with one or more pre-determined classification categories, to configure, using the second server, the copy of the item for presentation, according to an association generated between the matter tag and the hierarchy of matter tags, on a client in an interface associated with the second application using a second format, and to automatically classify another item transmitted from the first location to the second location by associating another tag with the another item, wherein the another tag is determined by using classification logic configured to identify a contextual association between the another item and the item and by evaluating the organizational data included with the another item.

14. The system recited in claim 13, wherein the organizational data comprises structured data.

15. The system recited in claim 13, wherein the organizational data comprises unstructured data.

16. The system recited in claim 13, wherein the organizational data comprises an e-mail.

17. The system recited in claim 13, wherein the organizational data comprises a task.

18. The system recited in claim 13, wherein the organizational data comprises a document.

19. The system recited in claim 13, wherein the organizational data comprises a message.

20. A computer program product embodied in a computer readable medium and comprising computer instructions for:

evaluating an item transmitted from a first computer to a second computer using a client-server network topology, the item comprising the organizational data, the item being created in a first application and having a first format, wherein a copy of the item is generated by a first server providing a physical operating environment for the first application;

sending the copy of the item from the first server to a second server in data communication with the first server, the second server providing another physical operating environment for a second application, the second application being configured to analyze the copy of the item using a hierarchy of matter tags that are determined based on an industry;

associating the copy of the item with a matter tag using the first server and the second server, the matter tag being associated with the hierarchy of matter tags based on a type or a classification, automatically associating the matter tag using a matter tag module, the type or classification being determined based on the industry wherein the matter tag indicates an item type, an item appearance when delivering the copy of the item in a search result, and an item classification when the copy of the item is not associated with one or more pre-determined classification categories;

configuring, using the second server, the copy of the item for presentation on a client in an interface associated with the second application using a second format; and automatically classifying another item transmitted from the first computer to the second computer by associating another tag with the another item wherein the another tag is determined by using classification logic configured to identify a contextual association between the another item and the item and by evaluating the organizational data included with the another item.

* * * * *